United States Patent

[11] 3,590,639

| [72] | Inventor | Yves Marie Ponsar<br>Villemonble, France |
|---|---|---|
| [21] | Appl. No. | 761,621 |
| [22] | Filed | Sept. 23, 1968 |
| [45] | Patented | July 6, 1971 |
| [73] | Assignee | Degremont Societe Generale D'Epuration Et D'Assainissement<br>Rueil Malmaison, France |
| [32] | Priority | Sept. 27, 1967 |
| [33] | | France |
| [31] | | 122400 |

[54] PRESSURE INDICATING AND/OR REGULATING DEVICES
13 Claims, 7 Drawing Figs.

[52] U.S. Cl. ............................................. 73/404
[51] Int. Cl. ............................................. G01l 7/72
[50] Field of Search ............................................. 73/404, 388, 403; 252/11

[56] References Cited
UNITED STATES PATENTS

| 1,880,206 | 10/1932 | Ledoux | 73/404 X |
| 1,909,254 | 5/1933 | Crowell, Jr. | 73/404 X |
| 2,210,868 | 8/1940 | Larson | 251/11 X |
| 2,439,342 | 4/1948 | Hudson | 73/403 |

*Primary Examiner*—Donald O. Woodiel
*Attorney*—Spencer & Kaye

ABSTRACT: A pressure measuring and/or regulating device incorporating a movable solid body placed in a liquid-filled chamber. The body has a fluid-filled lower recess and has vertical surfaces directed upwards and/or downwards. One of these is a downwardly directed surface which is exposed to the fluid in the recess and another is an upwardly directed surface which is exposed to the liquid medium. The second surface is higher than the first and serves to correct for the Archimedean thrust applied to a third surface of this body which is directed downwardly, which is lower than the first and second surface, and which is exposed to the liquid.

PATENTED JUL-6 1971 3,590,639

INVENTOR:
Yves Marie Ponsar
BY Spencer & Kaye
Attorneys

PRESSURE INDICATING AND/OR REGULATING DEVICES

The present invention relates to pressure measuring and/or regulating devices comprising at least one movable solid body having on the one hand volumes with variable immersion in a fluid intended to serve as a hydraulic joint or seal, and on the other hand, working surfaces subjected to the pressure of driving fluids or, accessorily, acting on the said pressures. The solid body is intended to produce a force as a function of the applied pressures and/or to take up certain positions as a function of the said pressures, and/or to act on the said pressures as a function of its own weight and of similar forces which may be applied to it, for example elastic forces.

A large number of pressure measuring devices are already known in which a fixed capacity contains a sealing liquid in which is partially immersed a movable bell, the upper end or head of which is subjected to the effect of differential pressures of gas, for example. In these devices, the difference between the pressures applied on each side of the bell head causes a movement (frequently vertical) of the bell, and this movement can be utilized to operate a gate valve, to actuate an electric contact, to displace an indicator needle, etc.; conversely, with gas bells, it is the weight of the bell which determines the pressure of the gas which it contains.

All these simple devices work satisfactorily as long as it is possible to neglect the force due to variation of the buoyancy thrust applied by the liquid acting on the hydraulic joint, on the lower edge of the bell, which has a variable degree of immersion. For certain applications in which great accuracy is desired, it may be considered that the variation of this force in dependence on the travel is undesirable (force directed upwards and increasing as the bell moves downwards). It may be desirable either to reduce this variation or to eliminate it, or even to reverse its direction (in which case the buoyancy force is either directed upwards and diminishes when the bell moves down, or is directed upwards and increases as the bell moves downwards).

The invention has for its object improvements in pressure measuring and/or regulating devices, and in particular a hydraulic seal in which the arrangement of the surfaces and volumes sensitive to the hydraulic effects of the joint enables the desired equilibrium to be obtained.

More particularly, one of the objects of the invention is to reduce or eliminate at will, or even to reverse the variation (a function of the travel) of the buoyancy force applied to the gradually immersed volumes of the moving body of the systems described comprising one or a plurality of hydraulic joints.

Another object of the invention is to permit the moving body of the said systems to be subjected to a buoyancy force directed downwards while it is immersed more or less completely in one or more liquid media serving as hydraulic joints, a liquid medium comprising either a single liquid or liquids of different densities.

A further object of the invention is to permit the downward movement of the moving bell to be subjected to the variation of the differential gas pressure, although the moving bell is totally immersed.

Another object of the invention is to produce an arrangement such that a moving bell, although totally immersed, is subjected to an Archimedean thrust which is a function of its immersion.

A further object is to eliminate risk of errors due to elastic forces.

Another object is to obtain a dashpot effect.

According to the invention, in a chamber containing a medium consisting of at least one liquid, is placed a movable solid body comprising a lower recess in which is a fluid, generally gaseous, the said body being provided, in addition to vertical surfaces, with surfaces directed upwards and/or downwards, of which a first surface, directed downwards and exposed to the generally gaseous fluid, and a second surface of the movable body directed upwards and exposed to the liquid medium, are associated in the vicinity of each other, the second surface being located higher than the first and constituting a correction means for the Archimedean thrust applied to a third surface of the movable body, directed downwards and lower than the first two, and exposed to the liquid medium.

According to another characteristic feature, means are provided for improving the liquid medium intended to serve as the hydraulic joint, in the sense that while, in certain cases, this medium may be constituted by a single liquid, in other cases, according to the invention, a number of superposed liquids may be chosen, the lowest or heaviest of which will be in contact with the portion concerned of the third surface while another, lighter and higher, will be in contact with the portion concerned of the second surface.

According to the invention, the relative value of the wetted surfaces is fixed as a function of the density of the liquid or liquids which are in contact therewith, so that, depending on the variations of the downward travel of the solid bodies, the algebraic sum of the hydraulic thrusts varies positively, remains constant, or varies negatively at will and/or that this sum is positive, zero or negative for a starting position, again at will.

By virtue of these arrangements, the parasitic forces due to variations of the Archimedean thrust on the movable bells and the like can be eliminated in numerous cases, whether considering, as above, the travel of the bell or alternatively the filling defects of the hydraulic joint and/or the evaporation of the liquid joint and/or the expansion of its container.

The objects, characteristic features and advantages of the invention will be further brought out in the description which follows below of forms of embodiment chosen by way of example, reference being made to the accompanying drawings in which, according to the invention:

Figure 1:
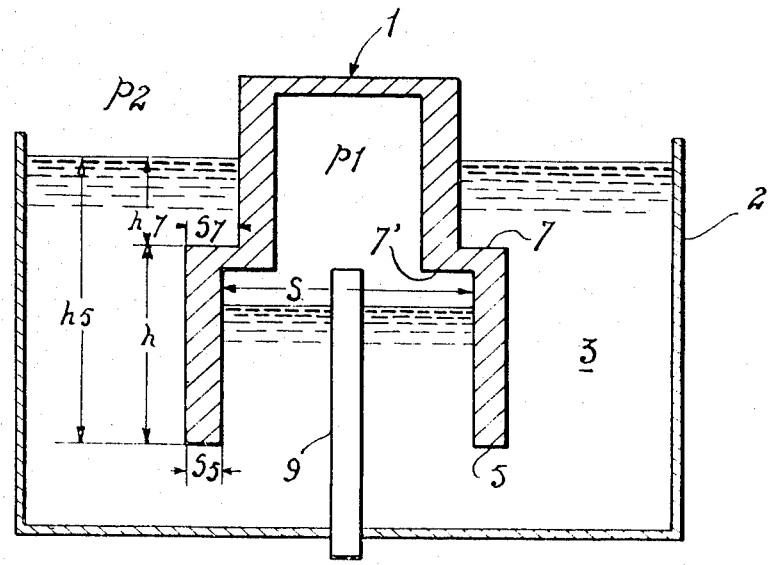
FIG. 1 is a view of a diagrammatic section of a bell half immersed in a single liquid.

Reference will first be made to FIG. 1, in which is shown a movable body 1 in the form of a bell, partly immersed in a homogeneous liquid 3 having a density $d$ and contained in a bowl 2 (which has been shown without its cover, when required) in which a gas could be maintained at a pressure $p_2$ different from the ambient pressure. The movable body 1 is a body of revolution with an upper end or head, while its lower portion 5, the edge of which has a surface $S_5$, is widely open, so that the liquid 3 circulates freely between the interior and the exterior of the hollow body 1. The head of the body 1 is fluidtight and enables a gas introduced through a lower inlet tube 9 to be maintained at the pressure $p_1$, this pressure $p_1$ being applied against a surface S of the body 1.

The bell 1 differs from the usual bells in that it is not cylindrical but comprises an intermediate narrowed portion 7, 7' having an upper face 7 with a surface $S_7$ and a lower face 7'. The pressure $p_1$ is kept sufficiently high as compared with $p_2$ so that the face 7' is not wetted by the liquid 3 while the face 7 is always under the liquid 3.

Thus, the movable body 1 comprises two horizontal wetted surfaces, one having a surface area $S_5$ directed downwards and located at a depth $h_5$ under the liquid 3 which, for its part, thus applies to the body 1 a force $F_5$ directed upwards.

$$F_5 = d \cdot h \cdot S_5 \quad (1)$$

The other surface area $S_7$, facing upwards and located at a depth $h_7$ under the liquid 3 which, for its part, applies to the body 1 a force $F_7$ directed downwards:

$$F_7 = d \cdot h_7 \cdot S \qquad (2)$$

The resultant of these two forces of the "Archimedean thrust" type is of the form:

$$F_5 - F_7 = d(ha85 \cdot S_5 - h_7 \cdot S_7) \qquad (3)$$

By putting $h = h_5 - h_7$ there is obtained:

$$F_5 - F_7 = d[h \cdot S_5 + h_7(S_5 - _7)] \qquad (4)$$

Figure 1B:
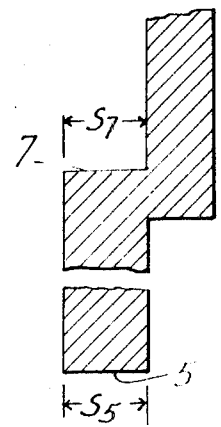
FIG. 1b is a view similar to that of FIG. 1a of another modified form of construction.

Given that $h$ is a constant, this latter formula shows that:

If $S_7$ is smaller than $S_5$, as shown in FIG. 1b, the variation of the Archimedean thrust on the body 1 as a function of the travel characterized by the variation of $h_7$ is of the same origin as with the usual bells (in which $S_7 = 0$), but it is smaller. The result is that it is possible to construct movable bells which are fairly thick for reasons of rigidity, but the travel of which will however be greater than for the usual bells, when the difference of pressure $p_1 - p_2$ varies.

If $S_7 = S_5$, as shown in FIG. 1b, the variation of the Archimedean thrust is zero as a function of the travel. Thus, the equilibrium of the bell will be unaffected at all positions for a single value of $p_1 - p_2$ corresponding to exact equilibrium. If $p_1 - p_2$ does not correspond to this equilibrium value, the movable bell will move against one of its limit stops (not shown).

If $S_7$ is greater than $S_5$, as illustrated in FIG. 1, the variation of the Archimedean thrust is the reverse of the usual, which permits of operation by "all or nothing," such as is desirable for certain applications.

It will be noted that in a device such as that shown in FIG. 1, the effects of instability are such that a defect of verticality of the bell can be amplified by the effect of the surface area $S_7$ which would be lower on one side than on the other. Such a disadvantage is overcome by the construction shown in FIG. 2, to which reference will now be made.

Figure 2:
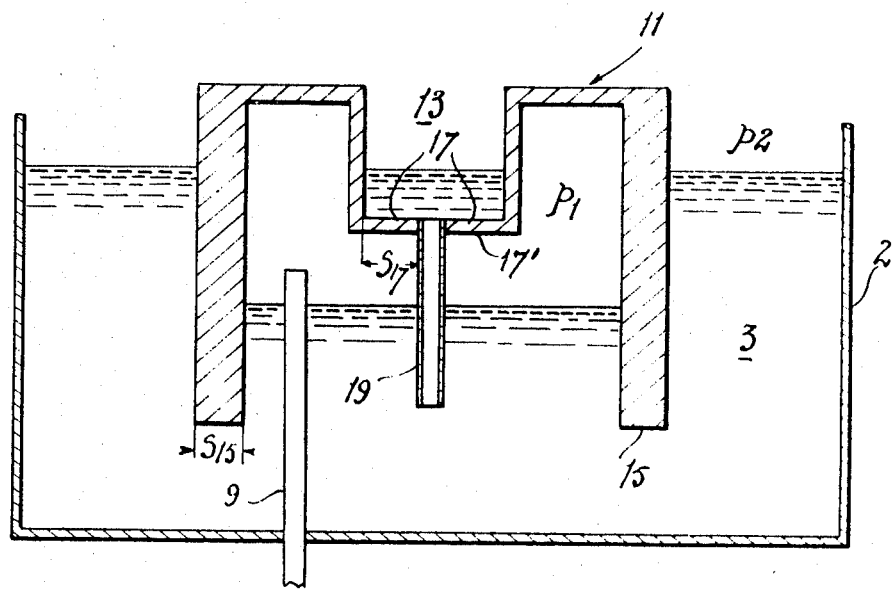
FIG. 2 is a cross section of an alternative form of semi-immersed bell.

In FIG. 2, the bell 11 is more easily produced externally since it is cylindrical with a constant wall thickness. This is at its lower portion 15 which has a section S15. The movable upper end comprises a cylindrical bowl 13, of which the bottom 17 having a useful section S17 is pierced so as to receive a vertical tube 19 passing down underneath the sealing liquid 3, and the wall section of which is to be included in the surface area S15. As the open portion of the bowl 13 is subjected to the gaseous pressure $p_2$, this bowl partially fills with the liquid 3, the surface of which comes to the same level as that of the liquid surrounding the bell 11.

The operation of the device shown in FIG. 2 is identical with that of FIG. 1, and all that has already been stated can be repeated, except as regards the risks of tilting, which have disappeared, since, in the event of rotation about a horizontal axis, the surfaces S15 are displaced much more than the surfaces S17 and ensure transverse stability.

It will be well understood that the devices of FIG. 1 and especially of FIG. 2 are very sensitive and have a very clear displacement for variations of $p_1 - p_2$ of the order of one-tenth millimeters head of water.

Figure 3:
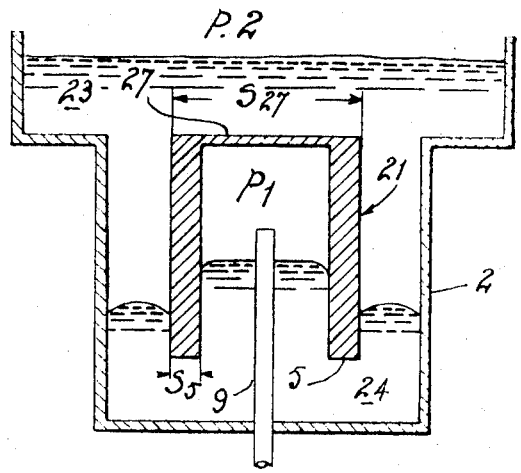
FIG. 3 is a section of a completely immersed bell with a hydraulic joint comprising two liquids.
Figure 1A:
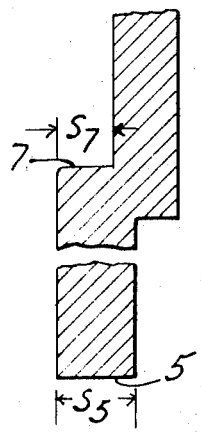
FIG. 1a is a detail view of a portion of a modified form of the bell of FIG. 1.

However, they necessitate a fairly high value for $p_1 - p_2$, in order to ensure that the faces 7 or 17 are wetted, while the lower faces 17 or 17' must remain dry. For the same reason, the filling of the hydraulic joint with liquid must be relatively precise. FIG. 3 provides an improvement from this latter point of view.

In FIG. 3, in which there are two liquids (mercury and oil), the Archimedean thrust which is to be compensated is created by the mercury whereas the compensating thrust acts by means of oil.

The surface area over which this second thrust acts is therefore greater than the first. By the magnitude of this second surface, there is obtained a piston of large section adapted to form an efficient dashpot.

In FIG. 3 is shown a bell 21 which is perfectly conventional but which, according to one aspect of the invention, is utilized in a joint having two liquids of different densities: a first heavy liquid 24, such as mercury, and a second light liquid 23, such as oil, resting on the first at the exterior of the bell 21. The travel is limited by stops (not shown) in such manner that the face 5 cannot pass out of the mercury or that the upper end or head cannot pass out of the oil.

Because of the large variations of pressure created by the travel through the mercury of the face 5 having a small surface area $S_5$, the face 27 which moves under the oil must have a surface area S27 considerably greater than $S_5$ in order to produce an opposite effect of the same magnitude.

It is for this reason that the whole surface of the head has been placed under the oil. It should even be observed that the downward movement of the head 27 causes a fall in the free level of the oil, so that the real downward displacement of the head under this oil level will be most definite if the free surface of this oil level is definitely greater than S27. An appropriate design of the bowl 2 thus comprises a widened upper portion followed by a narrower lower portion so as to reduce the quantity of mercury 24.

In addition, the Archimedean thrust created on the bell by the mercury readily exceeds the weight of the said bell and the reversed Archimedean thrust of the oil on the head, so that it is easy to produce a bell which will be in equilibrium under $p_2$, equal to atmospheric pressure, and $p_1$ lower than atmospheric pressure. In other words, the differential pressure $p_1 - p_2$ does not necessarily have to be positive as in the cases of FIGS. 1 and 2, but may be positive, zero or negative, as may be desired.

Finally, all the hydrostatic calculations being assumed to be correctly made and the calibrations accurately effected, the device of FIG. 3 appears to be particularly suitable for the solving of certain problems in which $p_1 - p_2$ is small or even negative.

It will be understood that designs of bells similar to those of FIGS. 1 and 2 can, if so desired, be transposed to the case of FIG. 3 in which there are two liquids.

Figure 4:
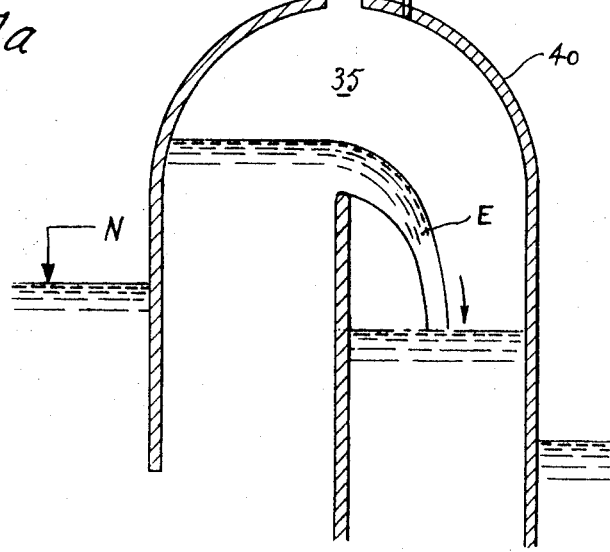
FIG. 4 shows a syphon with a partialized flow of water, the regulation of which is effected by a device in accordance with the invention.
Figure 5:
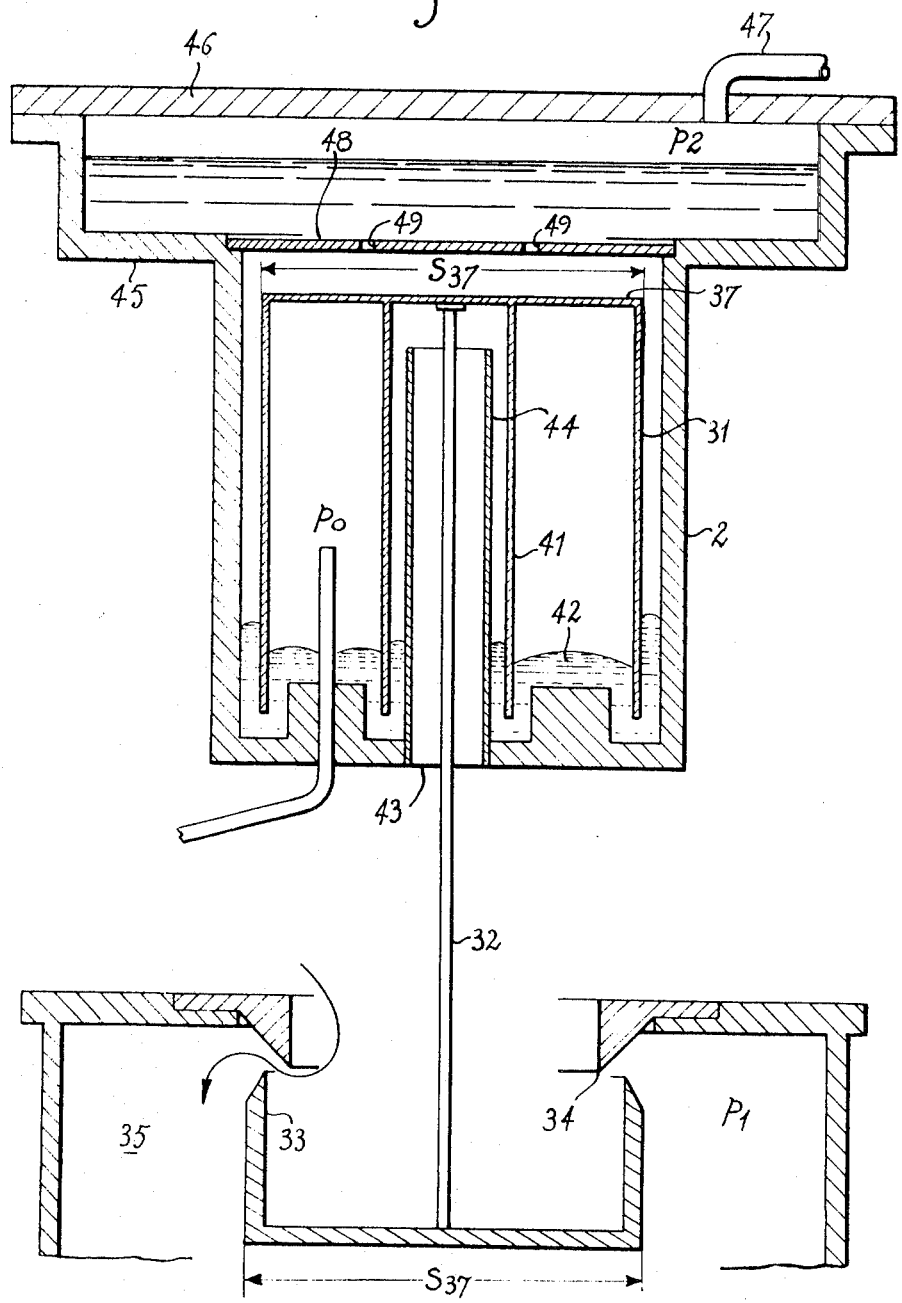
FIG. 5 is a view in cross section of this regulating device.

Reference will now be made to FIGS. 4 and 5. In FIG. 5 there is shown a complete apparatus in which the movable bell 31 is coupled by a rod 32 to a moving valve 33 which can bear on a seating 34 forming part, for example of the chamber 35 of a syphon 40 (FIG. 4) in which there exists a depression $p_1$ and intended to deliver a flow of water E limited by the inlet of air permitted by the valve 33.

The bell 31 is similar to that of FIG. 3, except that it further comprises an internal tube 41 welded at its upper portion to its moving head 37 and passing down into the mercury bath 42 so as to form a second hydraulic joint which separates the zone in which there is introduced a pressure $p_0$ from the zone connected to the atmosphere by the passage of the rod 32.

The chamber 2 comprises a lower orifice 43 from which rises a tube 44 intended to limit the mercury bath. At its lower portion, this chamber contains the bath of mercury with oil superposed which surrounds the bell and which, as in FIG. 3, completely immerses the head of the bell 31 and is provided with a wider portion 45 in the form of a bowl at the upper part of the said chamber 2. This bowl 45 is provided with a fluid-tight cover 46 and an intake of air 47 at the pressure $p_2$ which will exist above the oil. There will be observed a plate 48 pierced with orifices 49 which prevents excessively rapid movements of the oil so as to retard possible oscillations of the moving assembly 31, 41, 32, 33.

It will be noted that the pressure $p_0$ under the bell exists over a surface which is smaller than S37; in fact, in the case considered, the differential pressure which it is desired to regulate is $p_1 - p_2$, in which the pressure is conveyed, with respect to FIG. 3, underneath the valve, the surface of which is exactly that of S37 by its construction.

The pressure $p_0$ is a simple auxiliary which can be employed to modify the orders given to the syphon or simply to carry the weight of the moving parts.

The travel of the moving system is not in any way affected by variations of immersion of the bell in the mercury of the hydraulic joint, and the value $p_1 - p_2$ is a constant independent of the travel and depending solely on the desired variations of the pressure $p_0$.

In order to obtain a definite value of $p_1$ which, for upstream level conditions N (see FIG. 4) specified, results in a constant rate of flow of water, it is thus possible to act on $p_2$ and/or on $p_0$.

It is also possible to connect at 50 (FIG. 4) the pipe 47 to the chamber 35 forming part of the hood of the syphon, in which case the valve 33, irrespective of its opening, becomes perfectly balanced (by the moving bell) with respect to the variations of the pressure $p_1-p_2$, so that for all the balance operations, the value $p_0$ should also be constant, and such an arrangement constitutes an independent characteristic feature of the present invention, utilizable either in the control means of the Archimedean thrust or preferably in combination with this means.

A unit such as that shown in FIG. 5 can naturally be applied to numerous cases in practice apart from syphons.

It will of course be understood that the invention is not limited to the form of construction described and shown, but includes all alternative forms.

What I claim is:

1. In a pressure movement transducer for connection to a source of fluid whose pressure is to be monitored and comprising, in combination: a chamber having a closed bottom; a unitary mass of liquid partially filling said chamber; a vertically movable bell member partially immersed in said liquid and having its open end directed downwardly and its closed end directed upwardly; a mass of fluid different in nature from, and lower in density than, said liquid, said fluid being enclosed by the upper end of said bell and defining an interface with said liquid across the region enclosed by said bell; conduit means communicating with said fluid and arranged for placing said fluid in communication with such source of fluid; and a gaseous medium filling the portion of said chamber above said liquid and outside of the region enclosed by said bell, the improvement wherein the horizontal components of the wall surfaces of said bell comprise:
   a. a first surface component facing downwardly and contacting said fluid;
   b. a second surface component facing upwardly, disposed above said first surface component and contacting said liquid;
   c. a third surface component facing downwardly, disposed below said first surface component and contacting said liquid; and
   d. a fourth surface component face upwardly, disposed above said first surface component and contacting said gaseous medium;
   e. said second surface component constituting a correction means for the buoyant force applied to said third surface component by said liquid.

2. An arrangement as defined in claim 1 wherein said fluid is a gas.

3. A device as claimed in claim 2, in which said chamber contains another volume of gaseous fluid, the pressure of which acts on the closed end of said movable body.

4. A device as claimed in claim 2, in which said second surface and said third surface are in contact with the same liquid.

5. A device as claimed in claim 2, in which said second surface component has a smaller area than said third surface component.

6. A device as claimed in claim 2, in which said second surface component is in area to said third surface component.

7. A device as claimed in claim 2, in which said second surface component is greater in area than said third surface component.

8. An arrangement as defined in claim 2 wherein said first surface component is substantially horizontal.

9. In a pressure movement transducer for connection to a source of fluid whose pressure is to be monitored and comprising, in combination: a chamber having a closed bottom; a first unitary mass of liquid partially filling said chamber; a second unitary mass of liquid of lower density than the liquid of said first mass, disposed above said first mass to be in contact therewith and supported thereby; a vertically movable bell member having its open end directed downwardly and its closed end directed upwardly, said bell member being partially immersed in said first liquid mass; a mass of fluid different in nature from, and lower in density than, the liquid of either one of said masses, said fluid being enclosed by the upper end of said bell and defining an interface with one said liquid across the region enclosed by said bell; and conduit means communicating with said fluid and arranged for placing said fluid in communication with such source of fluid, the improvement wherein the horizontal components of the wall surfaces of said bell comprise:
   a. a first surface component facing downwardly and contacting said fluid;
   b. a second surface component facing upwardly, disposed above said first surface component and having at least a portion contacting said second mass of liquid; and
   c. a third surface component facing downwardly, disposed below said first surface component, and contacting said first mass of liquid;
   d. said second surface component constituting a correction means for the liquid buoyant force applied to said third surface component.

10. A device as claimed in claim 9, further comprising dashpot means cooperating with the liquid in contact with said second surface component, which is considerably less dense than that in contact with said third surface component.

11. A device as claimed in claim 9, in which said movable body is totally immersed in the medium formed by the two said liquids.

12. A closure device comprising a device as claimed in claim 9 and a member moveable relative to a passage and connected for movement with said bell member in a direction to close the passage.

13. A syphon comprising a closure device as claimed in claim 10 connected for controlling the pressure in said syphon.